United States Patent
Platto et al.

(10) Patent No.: US 8,702,152 B1
(45) Date of Patent: Apr. 22, 2014

(54) DEPLOYABLE FRONT AIR DAM

(71) Applicant: Ford Global Technologies, LLC, Dearborn, MI (US)

(72) Inventors: Gordon M. Platto, Troy, MI (US); David Michael Lechkun, Shelby Township, MI (US); Dong Park, Royal Oak, MI (US); Brad Alan Richards, Bloomfield Hills, MI (US); Jonathan Fontaine, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/739,647

(22) Filed: Jan. 11, 2013

(51) Int. Cl.
  *B62D 35/02* (2006.01)
(52) U.S. Cl.
  USPC ..................................... 296/180.1; 296/180.5
(58) Field of Classification Search
  USPC ................................ 296/180.1, 180.5, 180.3
  See application file for complete search history.

(56) References Cited

U.S. PATENT DOCUMENTS

| | | | | |
|---|---|---|---|---|
| 4,159,140 A | * | 6/1979 | Chabot et al. ............... | 296/180.5 |
| 4,489,806 A | * | 12/1984 | Shimomura ................... | 180/313 |
| 4,659,130 A | * | 4/1987 | Dimora et al. .............. | 296/180.1 |
| 4,902,067 A | * | 2/1990 | Sakai et al. ................ | 296/180.1 |
| 4,904,016 A | * | 2/1990 | Tatsumi et al. ............. | 296/180.5 |
| 4,951,994 A | * | 8/1990 | Miwa ......................... | 296/180.1 |
| 5,458,391 A | * | 10/1995 | Ito et al. .................. | 296/180.1 |
| 6,886,883 B2 | * | 5/2005 | Jacquemard et al. ....... | 296/180.5 |
| 7,607,717 B2 | * | 10/2009 | Browne et al. ............. | 296/180.1 |
| 7,686,382 B2 | * | 3/2010 | Rober et al. ............... | 296/180.1 |
| 7,775,582 B2 | * | 8/2010 | Browne et al. ............. | 296/180.1 |
| 7,780,223 B2 | * | 8/2010 | Kottenstette et al. ...... | 296/180.1 |
| 8,100,460 B2 | * | 1/2012 | Butlin et al. ............... | 296/180.1 |
| 8,186,746 B2 | * | 5/2012 | Mackenzie et al. ........ | 296/180.5 |
| 8,215,703 B2 | * | 7/2012 | Goenueldinc .............. | 296/180.1 |
| 8,292,350 B2 | * | 10/2012 | Li et al. ..................... | 296/180.1 |
| 8,382,192 B2 | * | 2/2013 | Browne et al. ............. | 296/180.1 |
| 2007/0063541 A1 | * | 3/2007 | Browne et al. ............. | 296/180.1 |
| 2007/0216194 A1 | * | 9/2007 | Rober et al. ............... | 296/180.1 |
| 2009/0085371 A1 | | 4/2009 | Nagahama | |
| 2010/0032982 A1 | * | 2/2010 | Browne et al. ............. | 296/180.5 |
| 2010/0140976 A1 | * | 6/2010 | Browne et al. ............. | 296/180.1 |

(Continued)

FOREIGN PATENT DOCUMENTS

| | | |
|---|---|---|
| DE | 10235702 A | 12/2008 |
| JP | 4237686 A | 8/1992 |
| JP | 6298129 A | 10/1994 |
| WO | 2004089729 A1 | 10/2004 |

*Primary Examiner* — Glenn Dayoan
*Assistant Examiner* — Gregory Blankenship
(74) *Attorney, Agent, or Firm* — Frank A. MacKenzie; Brooks Kushman P.C.

(57) ABSTRACT

A retractable air dam assembly for a vehicle is provided. The air dam assembly has an air deflector panel adapted to be mounted adjacent a front bumper of a vehicle. A linear actuator is adapted to be mounted to the vehicle. At least one rocker arm is adapted to be mounted to the vehicle, and coupled to the linear actuator at a first end, and coupled to the panel at a second end. The linear actuator translates the panel linearly between a stowed position, in which the panel is at least partially concealed by the front bumper, and a deployed position, such that the panel at least partially extends a distance below a bottom surface of the front bumper to reduce airflow beneath the vehicle. A counter-balance is connected to a third end of the rocker arm to offset a weight of the panel.

18 Claims, 4 Drawing Sheets

(56) References Cited

U.S. PATENT DOCUMENTS

| | | | |
|---|---|---|---|
| 2010/0219661 A1* | 9/2010 | Butlin et al. | 296/180.1 |
| 2011/0260499 A1* | 10/2011 | Li et al. | 296/180.1 |
| 2012/0001450 A1* | 1/2012 | Li et al. | 296/180.1 |
| 2012/0153581 A1* | 6/2012 | Li | 280/5.514 |
| 2012/0330513 A1 | 12/2012 | Charnesky et al. | |

* cited by examiner

DEPLOYABLE FRONT AIR DAM

TECHNICAL FIELD

The present disclosure relates to aerodynamic front air dams for automotive vehicles.

BACKGROUND

Aerodynamic airflow considerations are a priority of vehicle body design. Effective airflow management over a vehicle body can be critical in meeting functional demands for passenger compartment acoustics, fuel efficiency and safety of passenger type vehicles. Aerodynamic design also enhances vehicles control and improves speed of passenger vehicles. Front air dams are a common aerodynamic feature used to controls airflow around the vehicle and limit front end lift and create down-force.

SUMMARY

In one embodiment, a retractable air dam assembly for a vehicle is provided. The air dam assembly has an air deflector panel adapted to be mounted adjacent a front bumper of a vehicle. A linear actuator is adapted to be mounted to the vehicle. At least one rocker arm is adapted to be mounted to the vehicle, and coupled to the linear actuator at a first end, and coupled to the panel at a second end. The linear actuator translates the panel linearly between a stowed position, in which the panel is at least partially concealed by the front bumper, and a deployed position, such that the panel at least partially extends a distance below a bottom surface of the front bumper to reduce airflow beneath the vehicle. A counter-balance is connected to a third end of the rocker arm to offset a weight of the panel.

In one other embodiment, a vehicle is provided. The vehicle includes a front bumper mounted to a vehicle frame. An air deflector panel is mounted for translation relative to the vehicle frame adjacent to the front bumper. A linear actuator is operably connected to the panel and the vehicle frame to move the panel in a generally vertical direction between a stowed position, and a deployed position. In the deployed position, the panel extends below the bumper to reduce airflow beneath the vehicle.

In one further embodiment a deployable air dam assembly for a vehicle is provided. The deployable air dam assembly includes an air deflector panel adapted to be mounted to a vehicle. A linear actuator is operably connected to the panel and adapted to be mounted to a vehicle. The linear actuator is adapted to move the panel substantially in a linear direction between a stowed position and a deployed position to reduce airflow beneath the vehicle.

In another embodiment, the deployable air dam assembly also includes a sensor and a controller. The controller is in communication with the sensor and the linear actuator. The controller is configured to actuate the linear actuator between the stowed position and the deployed position based on a sensor signal.

In another embodiment, the sensor signal includes a speed signal indicative of a vehicle speed and the controller commands the linear actuator to deploy the panel as the vehicle speed increases.

In another embodiment, the sensor signal includes a navigation signal and the controller commands the linear actuator to retract the panel based on the navigation signal.

In another embodiment, the panel has a convex profile in a transverse direction.

In another embodiment, the air deflector panel has a deflection surface oriented substantially vertical in both the stowed and deployed position.

In another embodiment, the deployable air dam assembly also includes a rocker arm coupled to the linear actuator at a first end. A counter-balance is connected to a second end of the rocker arm to offset a weight of the panel.

In another embodiment, the deployable air dam assembly also includes a transverse pivot shaft. The rocker arm pivots the pivot shaft as the linear actuator pivots the rocker arm.

DETAILED DESCRIPTION

Figure 1:
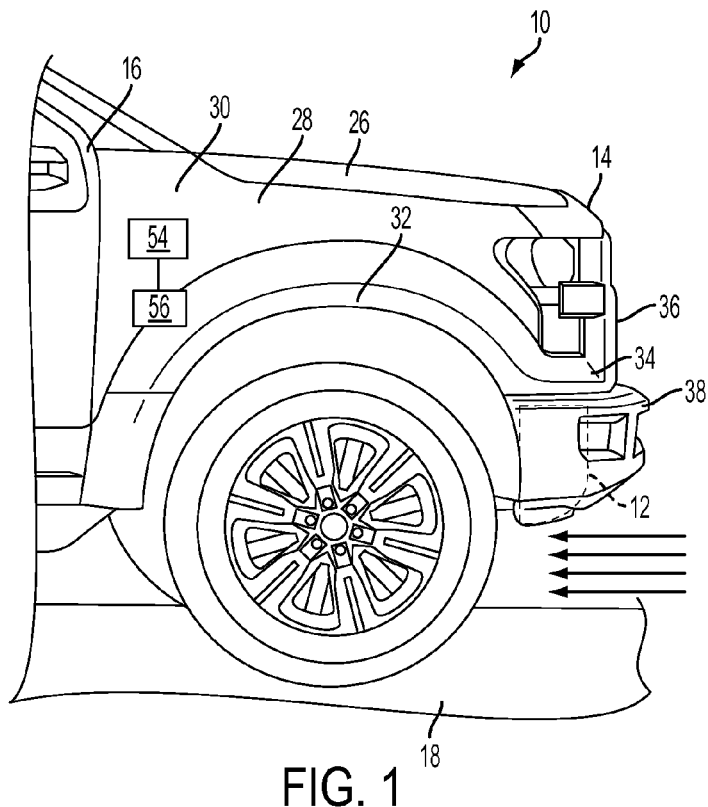
FIG. 1 is a side view of a front portion passenger vehicle including a deployable air dam illustrated in a stowed position, in accordance with an embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A front air dam is typically found on the front-end of a vehicle and appears as an extension to the bottom of the front bumper. Typically, the air dam is rigid and extends parallel to the ground and is attached to the bumper with support rods to ensure the front air dam remains parallel to the ground.

Depending on its positioning, a front air dam can limit how much air is directed under the vehicle by slicing through the incoming air stream and directing a portion of the airflow over the vehicle body. A front air dam can helpful in preventing front end lift as well as providing downward force on the vehicle. The overall reduced lift and increased down force is created by the air dam restricting airflow along the underbody of the vehicle.

To understand how a typical air dam prevents lift and creates downward force it is helpful to understand the fluid dynamics as oncoming air approaches the front of a vehicle. When oncoming air reaches the front of the vehicle it must come to a stop before it turns to move either up and over, down and under, or around the vehicle. Thus the front of the moving vehicle is an area of relatively high pressure.

The relatively high pressure at the front of a moving vehicle pushes back on the vehicle creating drag. The typical front air dam extends below the bumper close to the road and air flowing underneath the front air dam and vehicle creates somewhat of a Venturi effect, based on Bernoulli's equation, where pressure is decreased as air is forced through a constriction and speeds up in velocity. Thus the region between the air dam and the pavement is an area of low pressure. This adds up to a downward force on the air dam.

The resultant dynamic downward force generally helps the driver to retain control of the vehicle at higher road speeds. A front air dam is typically associated with racing vehicles. However, the aerodynamic principles also apply to passenger vehicles. But there are several factors which limit a typical front air dam's aerodynamic effectiveness on a passenger vehicle. Additionally, front air dams for passenger vehicles must be to have adequate ground clearance to accommodate suspension and body movement over dips and potholes, which makes typical air dams aerodynamically effective.

Utility vehicles, such as sport utility vehicles and pickup trucks, have also been popular in recent years. As utility vehicles have become popular for utilization as passenger vehicles, manufacturers of utility vehicles have incorporated many features into utility vehicles to enhance fuel efficiency, safety and control at high speeds.

Utility vehicles are often designed for travel through rough terrain. Additionally, utility vehicles are generally designed to haul cargo, whether in a cargo compartment, a bed of the vehicle, or by towing cargo with a trailer. In order to meet these extreme design requirements, utility vehicles are often provided with a vehicle body that is elevated greater than conventional passenger vehicles. In order to meet the fuel efficiency and safety standards while maintaining the elevated cargo compartments in utility vehicles, front end airflow management of utility vehicles is required.

Figure 2:
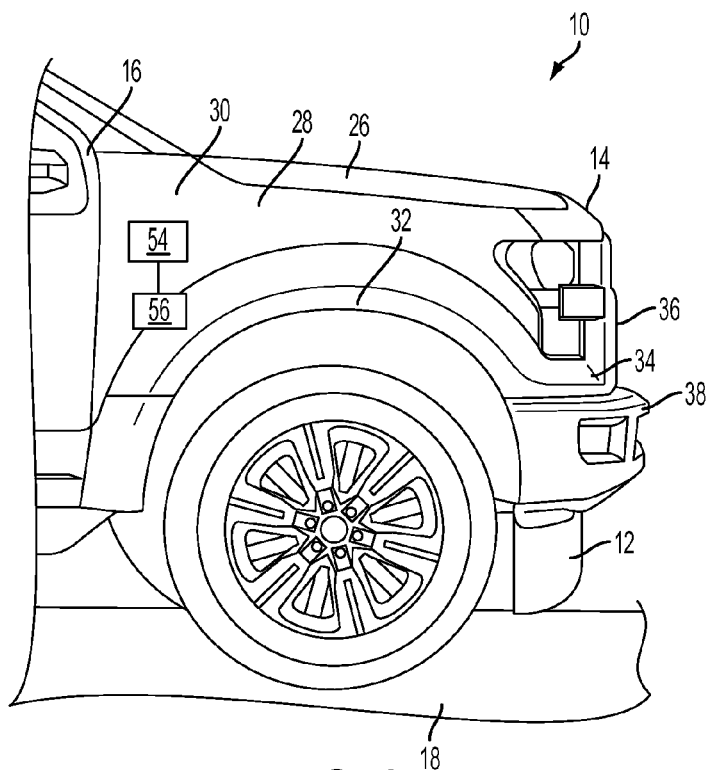
FIG. 2 is the side view of the front portion passenger vehicle illustrating the deployable air dam in a deployed position.

FIG. 1 and FIG. 2 illustrate a side perspective view of a passenger vehicle 10 including a front air dam panel 12 according to an embodiment of the present disclosure. In FIG. 1, the air dam panel 12 is raised up to a stowed position. FIG. 2 illustrates the air dam panel 12 in a deployed position where the air dam is lowered.

FIGS. 1 and 2 illustrate the front end 14 of the vehicle 10 that is a truck or sport utility vehicle having a vehicle body 16 elevated relative to an underlying support surface 18 upon which the vehicle 10 travels.

The front end 14 of the vehicle 10 includes an area forward of a passenger compartment in the longitudinal direction. As illustrated in FIG. 1, the front end 14 includes a hood 26 defining an engine compartment 28 there beneath. The front end also includes front quarter panels 30 on opposed lateral sides of the vehicle 10. Each quarter panel 30 defines a front wheel well 32 is illustrated on a right side of the vehicle 10. The left quarter panel is generally a mirror image. The engine compartment 28 is located laterally between the quarter panels 30.

The front end 14 also includes a front fascia 34. The front fascia 34 is generally located forward of the hood 26 and quarter panels 30. The front fascia 34 includes the front grille 36 and the bumper 38. The front grille 36 defines an opening to the engine compartment 28 in order to allow airflow into the air induction system and for cooling of the engine compartment 28. The grille 36 may be designed for vehicle styling and aesthetic appeal and may also include the vehicle manufacturer logo or may have ornamental design characteristics.

The bumper 38 provides energy absorption in the event of a front impact crash. As illustrated, the bumper 38 may extend forward of the grille 36. However, in other embodiments, the bumper 38 may be generally flush with the grille 36.

As shown in FIG. 2, in the deployed position, the air dam panel 12 is moved downward in the vertical direction in order to prevent airflow beneath the vehicle. In the deployed position, the front air dam panel 12 may extend an additional distance below a lower surface 40 of the bumper 38 or the front fascia 34. The air dam panel 12 may be offset from the front bumper 38 so that the air dam panel 12 is not flush with the bumper 38 in the vertical direction.

Unlike typical air dams which extend from the bumper and are located close to the ground to prevent air from flowing underneath the vehicle, trucks and utility passenger vehicles like those illustrated in FIGS. 1 and 2 must maintain a minimum ground clearance in order to prevent colliding with obstacles under certain road condition. Therefore, the front air dam panel 12 can be moved to the deployed position illustrated in FIG. 2 when road conditions are determined to be safe.

A deployable air dam assembly 50 may also include an air dam controller 54 to automatically actuate the air dam panel 12 between the deployed position and the stowed position. In the deployed position, the air dam panel 12 is lowered to a closer distance to the driving surface. The air dam panel 12 prevents some of the air from flowing beneath the vehicle and along the vehicle underbody by redirecting flow around the vehicle instead. In the stowed position, the air dam panel 2 is located substantially above the driving surface 18 and does not generally redirect airflow.

The air dam panel 12 may be capable of being positioned at many different deployed positions based on vehicle speed or environmental conditions, for example. The air dam controller 54 may control the deployed position of the air dam panel 12 based on speed or road obstacles. For example, the air dam panel 12 may be raised to the stowed position if the vehicle is being driven at lower speeds where there is not large drag, or if an obstacle is detected that could potentially damage the air dam panel 12 is detected by a vehicle sensor 56.

The vehicle sensor 56 may be any type of device used for detecting distance between the vehicle 10 and an externally located object, such as radar, a camera, LIDAR or even vehicle-to-vehicle communication. The vehicle 10 may also include sensors for detecting uneven road conditions though vibration sensors or sensors associated with the suspension system, for example. The vehicle sensors 56 are in communication with the air dam controller 54 and provide data signals to the controller 54.

Alternatively, a navigation system may indicate that a terrain of a given road is too rough to safely deploy . . . .

Figure 3:
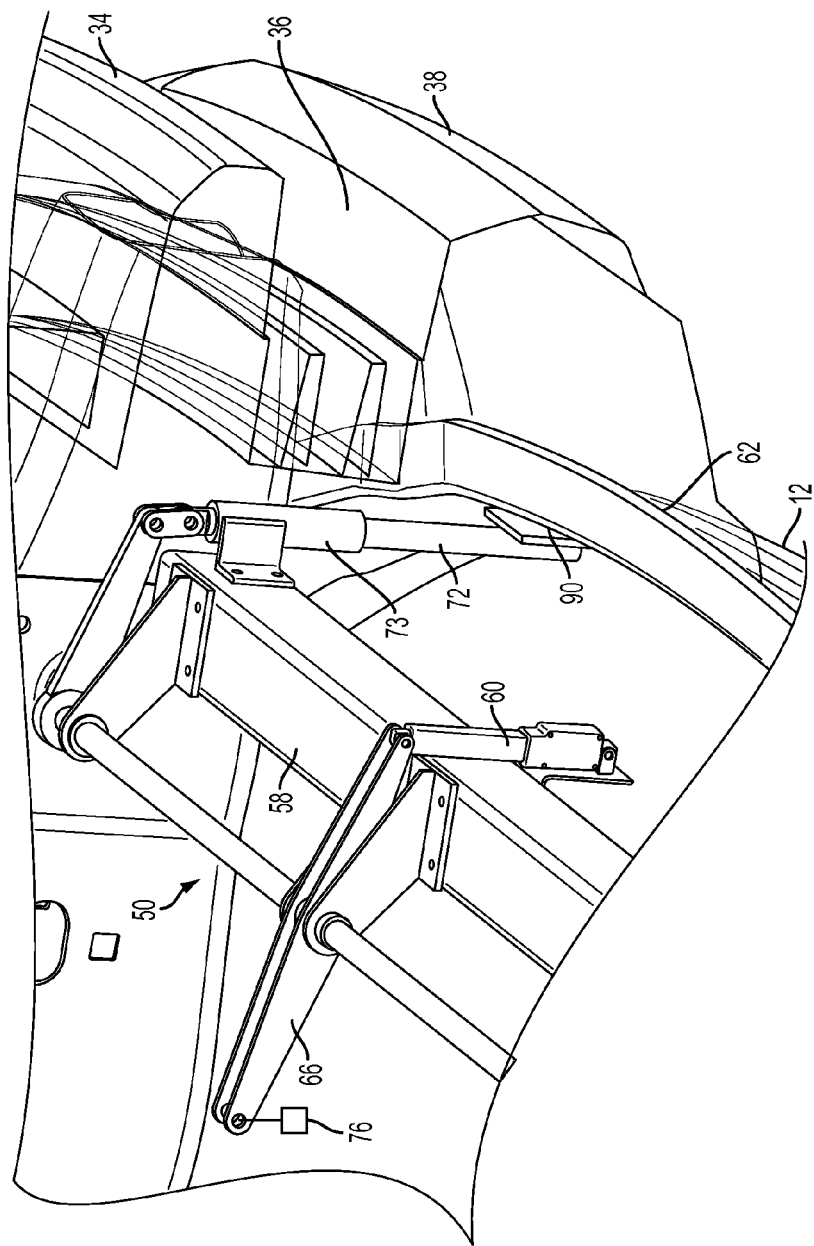
FIG. 3 is a front perspective view of the vehicle cut-away in order to illustrate a portion of a deployable air dam assembly.

FIGS. 3-6 illustrate the deployable air dam assembly 50 in more detail. FIG. 3 illustrates the front end 14 being partially cut-away to show a portion of the deployable air dam assembly 50 as it is mounted in the vehicle 10.

The deployable air dam assembly 50 is mounted to a vehicle frame 58. The vehicle frame 58 is disposed inboard of the front fascia 34 and the bumper 38. Likewise, the front fascia 34 and bumper 38 may also be mounted to the vehicle frame 58. As shown in FIG. 3, the air dam panel 12 may be positioned adjacent an inboard side 62 of the front fascia 34 and the bumper 38. The air dam panel 12 is also positioned below the grille 36 in the vertical direction. Even in the stowed position, the air dam panel 12 may not extend across the grille 36 openings so the airflow to the engine, for example, is not inhibited.

Figure 4:
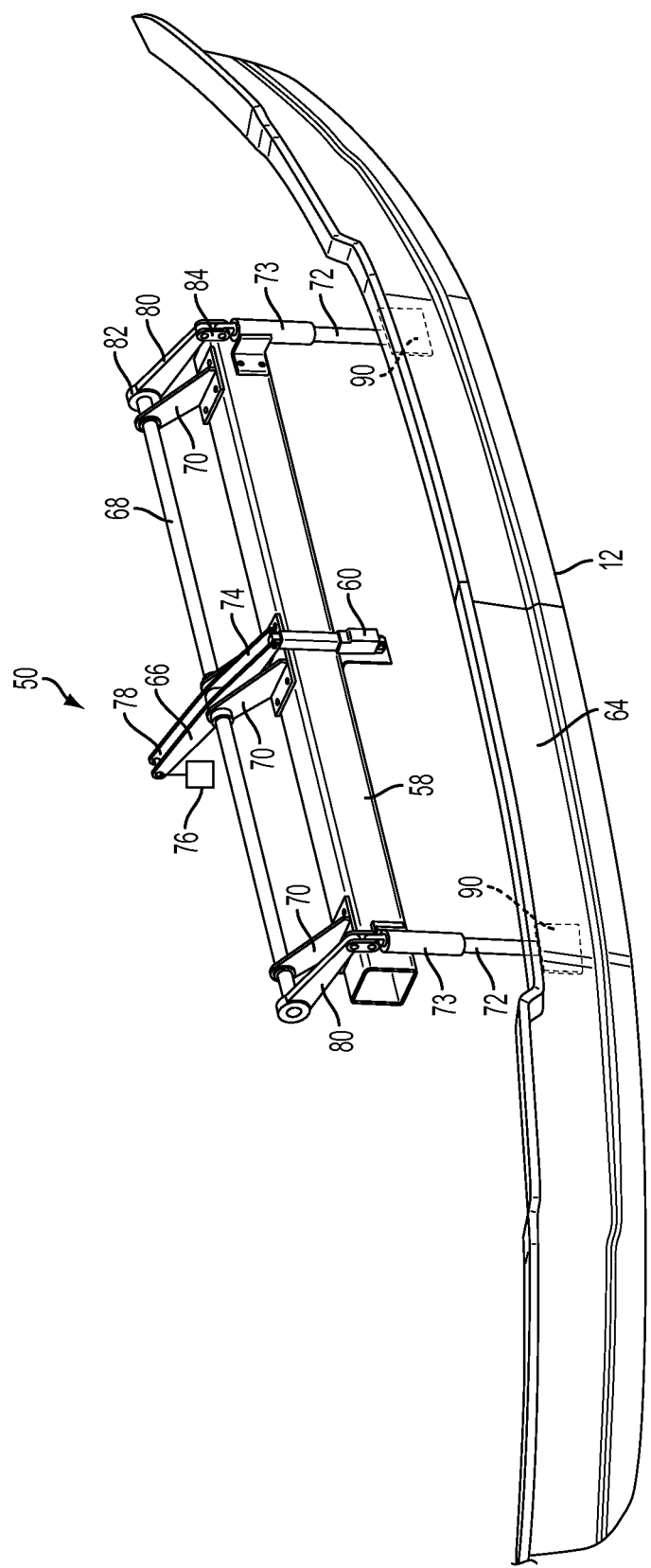
FIG. 4 is a front perspective view of a portion of the deployable air dam assembly of FIG. 3.
Figure 5:
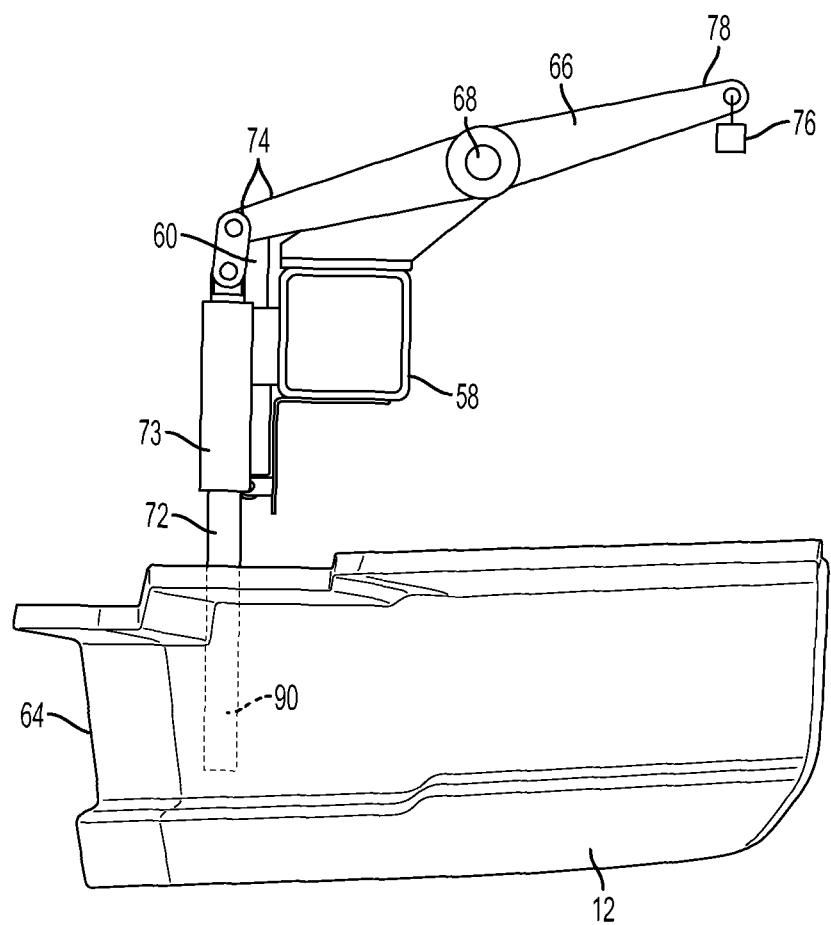
FIG. 5 is a side view of a portion of the deployable air dam assembly of FIG. 3.

Turning now to FIG. 4, the deployable air dam assembly 50 is shown in more detail. The deployable air dam assembly 50 includes a central linear actuator 60. However any suitable number of linear actuators 60 is contemplated. The linear actuator 60 may be any sort of actuator which moves substantially along one plane or creates motion in a straight line. For example, the linear actuator 60 may be an electric motor-driven actuator, a pneumatic or hydraulic cylinder, a telescoping actuator, screw actuator or linear slide actuator.

The linear actuator 60 provides advantages over other actuators. For example, the linear actuator 60 is relatively inexpensive and a simple design which is repeatable and durable. The linear actuator 60 may also be capable of high speeds to extend and retract the air dam panel 12 quickly if obstructions are detected in the road. Additionally, the linear actuator 60 is extendable to incremental positions to select a desired extension for a particular speed in order to optimize efficiency. As illustrated in the figures, the deployable air dam assembly includes at least two guide shafts 72 connected to the air dam panel 12 and supported by guide sleeves 73 with internal bearing assemblies upon the vehicle frame 58. The guide shafts 72 are lightweight and strong. Linear movement of the air dam panel 12 also allows the panel 12 to be positioned in multiple deployed positions while still maintaining an air deflection face 64 substantially vertical and perpendicular to the direction of travel to provide the greater air deflection.

The deployable air dam assembly 50 also includes a rocker arm 66. The rocker arm 66 pivots about a transverse pivot shaft 68 mounted to the frame 58. The transverse shaft 68 is offset from and parallel to the frame 58. The transverse shaft 68 is mounted to the frame 58 with brackets 70. The brackets 70 include apertures with bearing assemblies so that the transverse shaft 68 pivots with respect to the brackets 70.

The transverse pivot shaft 68 extends through the center of the rocker arm 66, however the transverse shaft 68 may be connected anywhere along the rocker arm 66. The rocker arm 66 is connected to the linear actuator 60 at a first end 74 and is connected to a counter-balance weight 76 at a second end 78.

The counter-balance weight counteracts the weight of the air dam panel 12. The counter-balance weight 76 reduces the force required by the linear actuator 60 thereby reducing the size of the linear actuator 60. The counter-balance weight 76 also aids the linear actuator 60 in moving the air dam panel 12 quicker from the deployed position to the stowed position.

As illustrated in the Figures, the deployable air dam assembly 50 may have only one counter-balance weight 76 connected to a central rocker arm 66. However, any number of rocker arms 66 and counter-balance weights 76 are contemplated. The deployable air dam assembly 50 also includes a lever arm 80 connected to the guide shaft 72 at a first end 84 and driven by transverse pivot shaft 68 at a second end 82.

The deployable air dam assembly 50 also includes a connector 90 for connecting the guide shaft 72 to the air dam panel 12. The deployable air dam assembly may include multiple connectors 90 for connecting each of the guide shafts 72 to the air dam panel 12. Each of the connectors 90 may have a different shape or dimension since the air dam panel 12 may have a convex profile curvature that may not be parallel to the vehicle frame 58 to which the guide shaft 72 is mounted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle air dam assembly comprising:
   an air deflector panel adapted to be mounted adjacent a front bumper of a vehicle;
   a linear actuator adapted to be mounted to the vehicle at a second end so that the linear actuator translates the panel linearly between a stowed position, in which the panel is at least partially concealed by the front bumper, and a deployed position, such that the panel at least partially extends a distance below a bottom surface of the front bumper to reduce airflow beneath the vehicle;
   at least one rocker arm adapted to be mounted to the vehicle, and coupled to the linear actuator at a first end, and coupled to the panel; and
   a counter-balance connected to a second end of the at least one rocker arm to offset a weight of the panel.

2. The air dam assembly of claim 1 further comprising a transverse pivot shaft, wherein the at least one rocker arm pivots the pivot shaft as the linear actuator pivots the rocker arm.

3. The air dam assembly of claim 1 wherein the at least one rocker arm further comprises a plurality of rocker arms.

4. The air dam assembly of claim 1 wherein the air deflector panel has a deflection surface oriented substantially vertical in both the stowed and deployed positions.

5. The air dam assembly of claim 1 wherein the linear actuator is adapted to be mounted to a vehicle frame.

6. The air dam assembly of claim 1 further comprising:
   a sensor; and
   a controller in communication with the linear actuator and the sensor, the controller being configured to actuate the linear actuator between the stowed position and the deployed position based on a sensor signal.

7. The air dam assembly of claim 6 wherein the sensor signal includes a navigation signal and the controller commands the linear actuator to retract the panel based on the navigation signal.

8. A vehicle comprising:
   a front bumper mounted to a vehicle frame;
   an air deflector panel mounted for translation to the vehicle frame adjacent to the front bumper;
   a linear actuator operably connected to the panel and the vehicle frame to move the panel in a generally vertical direction between a stowed position, and a deployed position wherein the panel extends at least partially below the bumper to reduce airflow beneath the vehicle;
   a rocker arm coupled to the linear actuator at a first end; and
   a counter-balance connected to a second end of the rocker arm to offset a weight of the panel.

9. The vehicle of claim 8 further comprising:
   a sensor; and
   a controller in communication with the sensor and the linear actuator, the controller being configured to actuate the linear actuator between the stowed position and the deployed position based on a sensor signal.

10. The vehicle of claim 8 wherein the panel has a convex profile in a transverse direction.

11. The vehicle of claim 8 wherein the air deflector panel has a deflection surface oriented substantially vertical in both the stowed and deployed position.

12. The vehicle of claim 8 further comprising a transverse pivot shaft, wherein the rocker arm pivots the pivot shaft as the linear actuator pivots the rocker arm.

13. The vehicle of claim 8 further comprising a plurality of rocker arms.

14. A deployable vehicle air dam assembly comprising:
   an air deflector panel for mounting to a vehicle;
   a linear actuator connected to the panel and for mounting to the vehicle to move the panel substantially in a linear direction between a stowed position and a deployed position;
   a rocker-arm coupled to the linear actuator at a first end; and
   a counter-balance connected to a second end of the rocker-arm to offset a weight of the panel.

15. The deployable vehicle air dam assembly of claim 14 further comprising:
- a sensor; and
- a controller in communication with the linear actuator and the sensor, the controller being configured to actuate the linear actuator between the stowed position and the deployed position based on a sensor signal.

16. The deployable vehicle air dam assembly of claim 15 wherein the sensor signal includes a speed signal indicative of a vehicle speed and the controller commands the linear actuator to deploy the panel as the vehicle speed increases.

17. The deployable vehicle air dam assembly of claim 15 wherein the sensor signal includes a navigation signal and the controller commands the linear actuator to retract the panel based on the navigation signal.

18. The deployable vehicle air dam assembly of claim 14 wherein the air deflector panel has a deflector face oriented substantially vertically in both the stowed and deployed position.

\* \* \* \* \*